June 2, 1953 E. W. MORTIMER 2,640,705

CONTROL MEANS FOR PHONOGRAPHS

Filed Dec. 5, 1946 5 Sheets-Sheet 1

INVENTOR
Edmund Walter Mortimer
By David J. Mccart
his attorney

June 2, 1953 E. W. MORTIMER 2,640,705

CONTROL MEANS FOR PHONOGRAPHS

Filed Dec. 5, 1946 5 Sheets-Sheet 2

INVENTOR
EDMUND WALTER MORTIMER

June 2, 1953 E. W. MORTIMER 2,640,705

CONTROL MEANS FOR PHONOGRAPHS

Filed Dec. 5, 1946 5 Sheets-Sheet 3

INVENTOR
Edward Walter Mortimer
By David J. Mosey
his attorney

INVENTOR
Edward Walter Mortimer
by [signature]
his attorney

INVENTOR
Edmund Walter Mortimer
By [illegible]
his attorney

Patented June 2, 1953

2,640,705

UNITED STATES PATENT OFFICE 2,640,705

CONTROL MEANS FOR PHONOGRAPHS

Edmund Walter Mortimer, Swindon, England, assignor to The Garrard Engineering & Manufacturing Company Limited, Swindon, England Application December 5, 1946, Serial No. 714,271
In Great Britain January 15, 1946

8 Claims. (Cl. 274—10)

Figure 1:
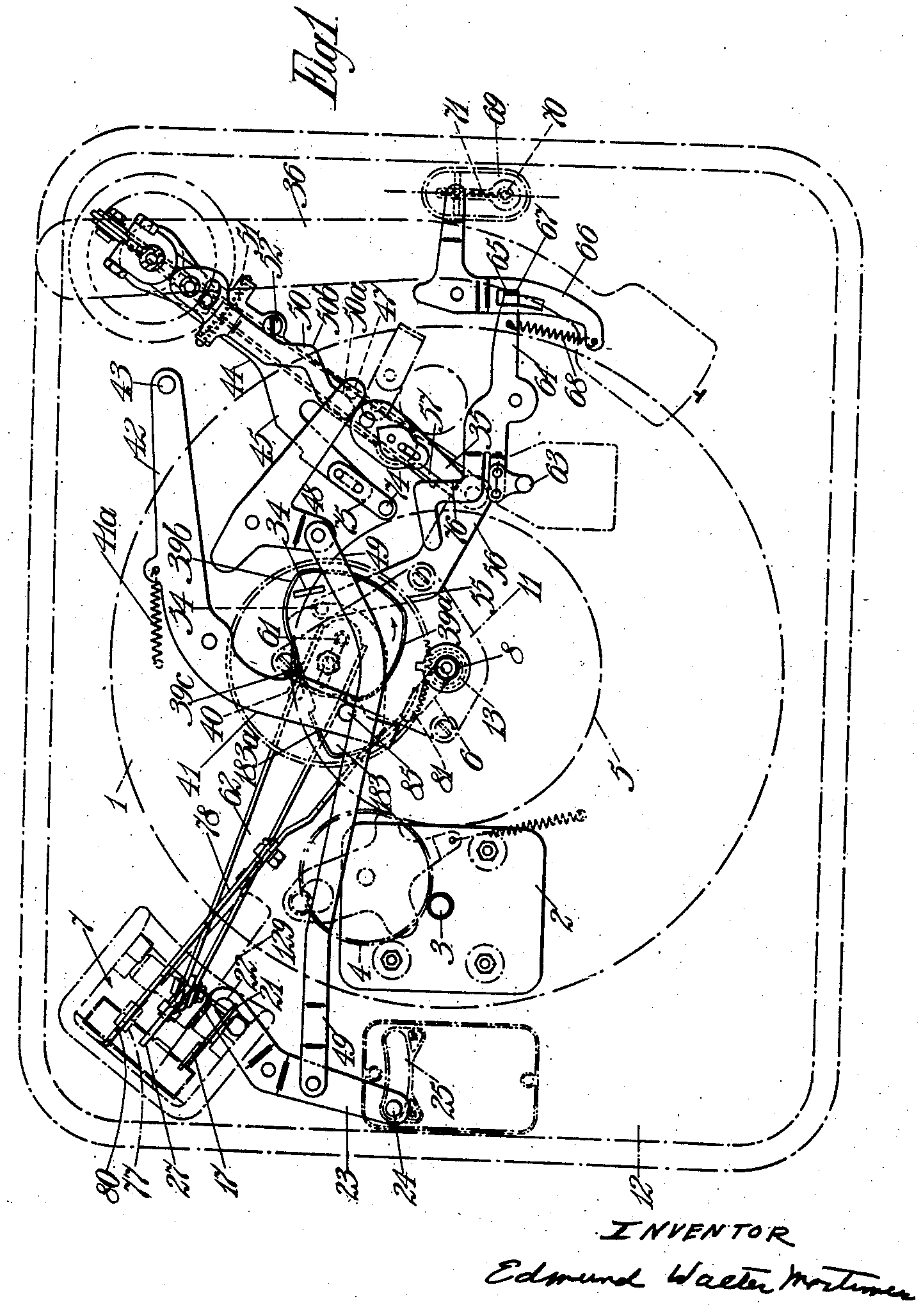

This invention relates to phonographs of the type incorporating a record changing mechanism whereby a number of records may be automatically played in sequence.

An object of the invention is to provide simplified control means adapted to be brought into operation through the agency of the needle at the end of the playing of a record whereby the tone arm or pick-up is raised and swung across the record; a fresh record delivered from a stack; and the tone arm or pick-up positioned and lowered to engage in the starting groove of such record.

Another object of the invention is to provide a phonograph having control means of the character referred to wherein means are provided whereby the automatic playing of records from stacks of 10″ or 12″ may be effected.

A further object of the invention is to provide improved and simplified platform means for supporting the rim of a stack of records whereby records of 10″ and 12″ may be alternately accommodated. Such platform may be used independently of the control means.

The invention consists in a phonograph having a record changing mechanism or control means therefor, comprising a rotary controlling element adapted to control the raising (and lowering) of the tone arm or pick-up and swinging of such across the record or turntable, the release of a record from the stack, the return of the tone arm or pick-up to the starting position and lowering thereof, said element being formed as an interrupted gear and being adapted to be intermittently driven from a pinion on the turntable spindle or other suitable moving part, the interruption being adapted to register with the pinion during the playing of a record, and means movable in accordance with the tone arm or pick-up adapted, when the needle enters the run-out or like groove, to engage a surface on and impart an initial movement to the controlling element to bring the teeth thereof into mesh with the pinion.

Means are preferably provided for ensuring the meshing of the teeth of the control element with those of the pinion without jarring and such may comprise resiliently mounting a number of the leading teeth on the control element whereby they may give way if necessary.

Three or other suitable number of leading teeth may be secured to a pivotal mounting whereby they may be displaced radially inward on the control element.

The invention also consists in a record supporting platform adapted to support the rim of an inclined stack of records comprising a displaceable section including a record supporting part and a feeding element for say 10″ records, and a rigid section having a feeding element for say 12″ records, the arrangement being such that when 12″ records are to be played, the displaceable section is moved, preferably by pivoting, to a position clear of the path of the records.

Preferably the feeding elements are coupled together so that the element for 10″ records derives its feeding movement from the element for the 12″ records.

The movements of the displaceable section may be effected by an actuating device which also sets a stop for determining the starting position of the tone arm or pick-up.

Figure 2:
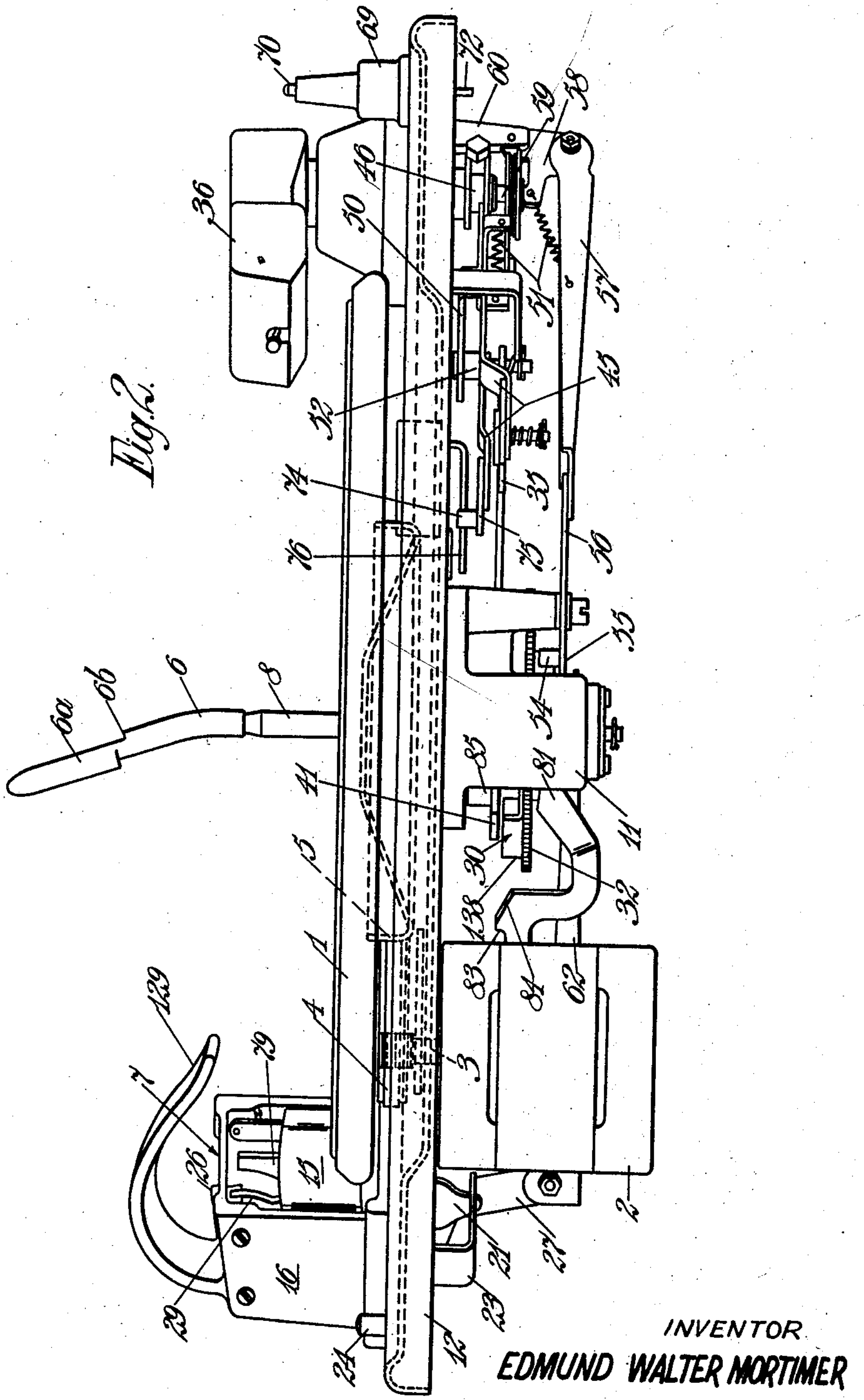
Figures 3, 4, 8, 9, 12:
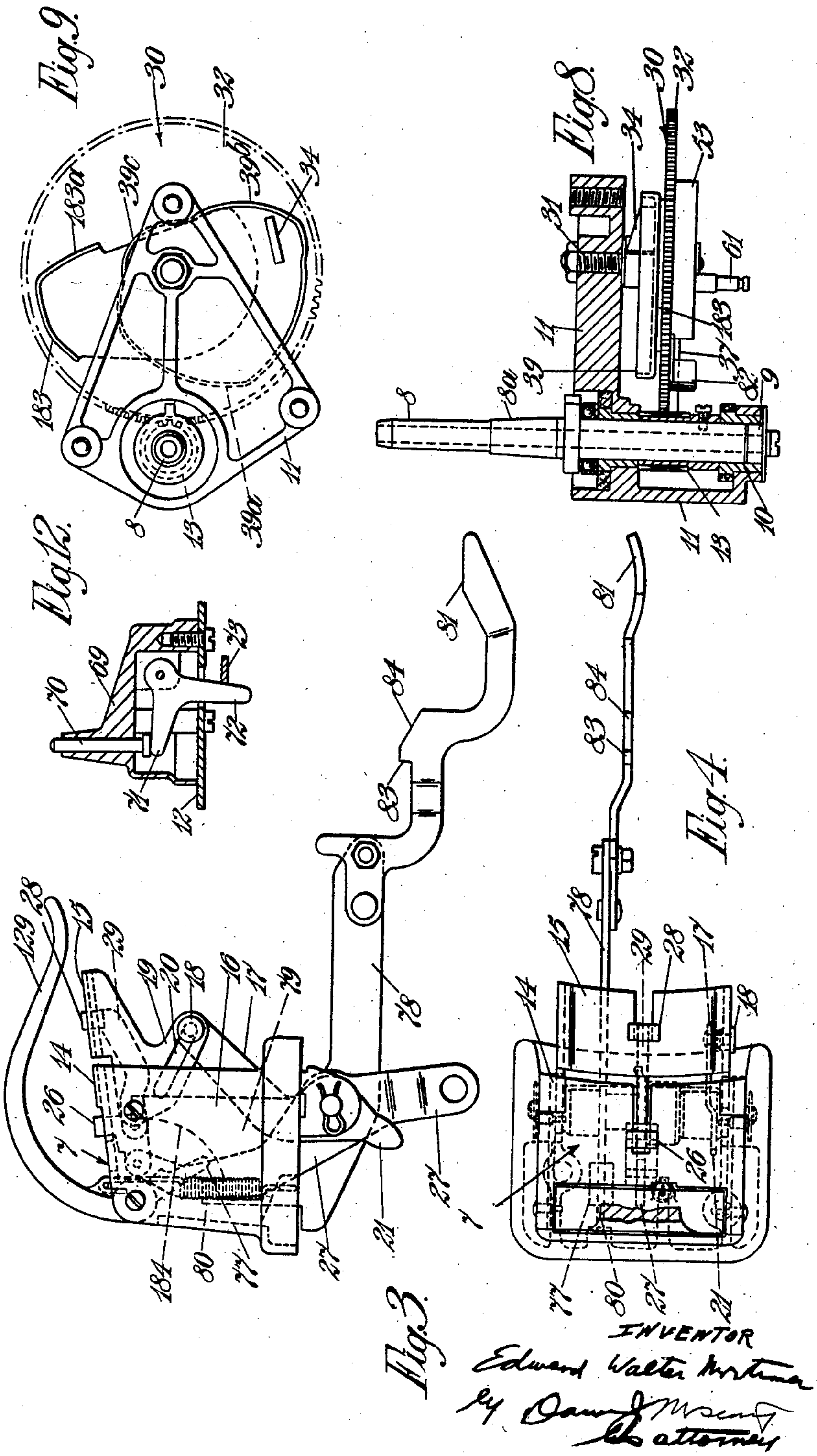
Figure 7:
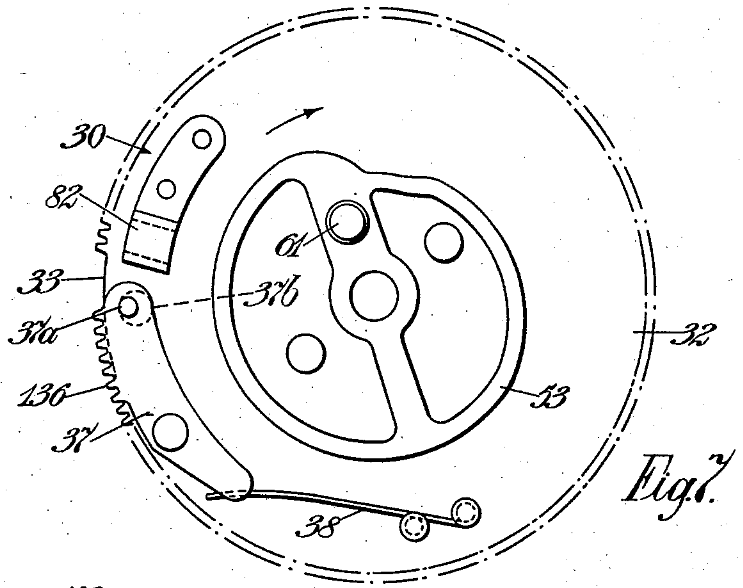
Figure 6:
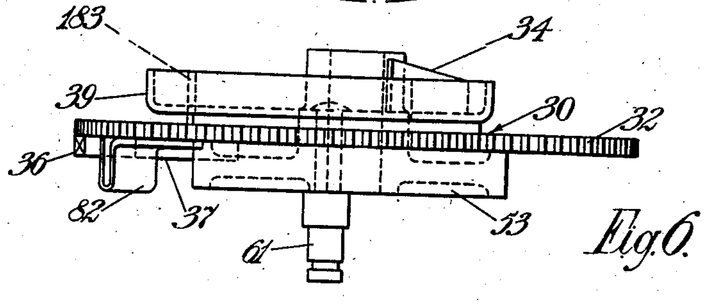
Figure 5:
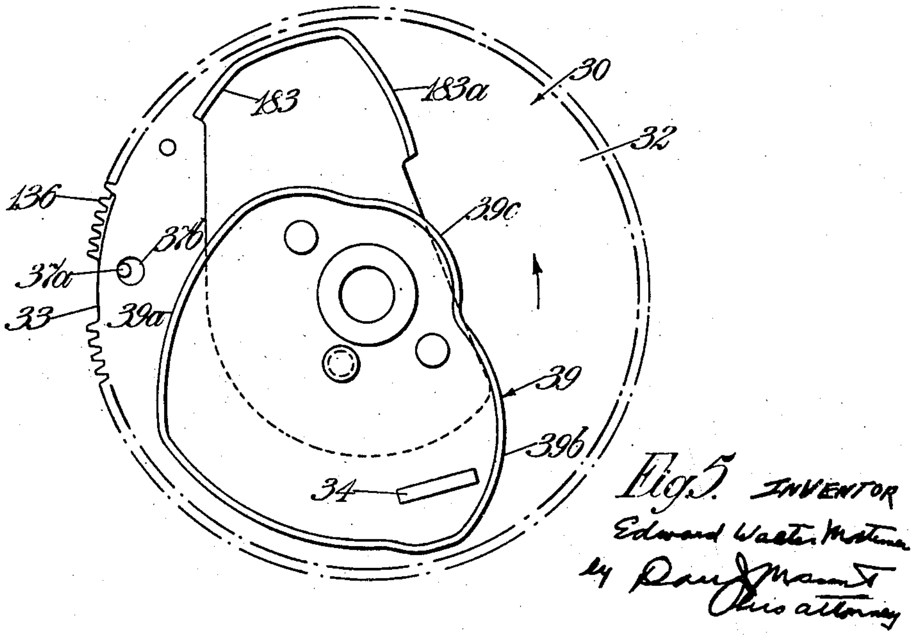
Figure 10:
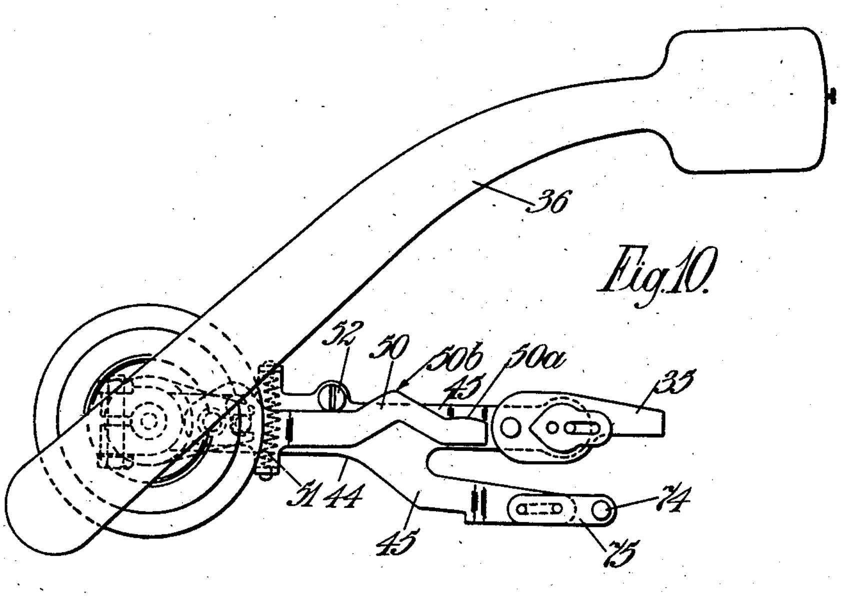
Figure 11:
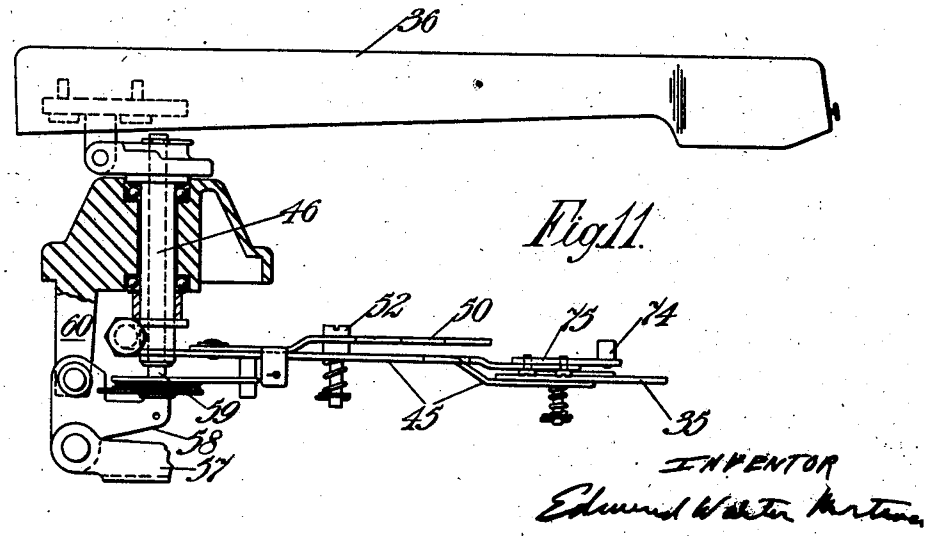

In the accompanying drawings:

Figure 1 is a plan of the record changer according to the invention, the parts being shown for playing 12″ records, Figure 2 is a front elevation, Figure 3 is a side elevation of the record platform feeding device with the knock-out lever, Figure 4 is a plan of Figure 3, Figure 5 is a plan view of the control element, Figure 6 is an elevation of Figure 5, Figure 7 is an inverted plan of the control element, Figure 8 is a partial sectional elevation of the turntable spindle and drive for the control element, Figure 9 is a plan of Figure 8, Figure 10 is a plan of the pick-up or tone arm and the control levers which partake of the movement thereof, Figure 11 is a part sectional elevation of Figure 10, and Figure 12 is a detail section on the line 12—12 of Figure 1.

In carrying the invention into effect according to one convenient mode, by way of example, the turntable 1 of the phonograph is driven from an electric motor 2 through a suitable reduction gear comprising a friction drive from the spindle 3 of the motor, the spring pressed wheel 4 having a rubber rim, and the drum 5 secured to and beneath the turntable.

The stack of records, either 10″ or 12″ but not mixed, is mounted above the turntable by a stationary spindle 6 having an upper inclined portion provided with an offset part 6a whereby the records are supported at their centres by a ledge 6b and at their rims by an inclined platform 7.

The stationary spindle 6 is inserted into a hollow rotary spindle 8 having a tapered portion 8a by which the turntable 1 is secured to the spindle. It is found that there is a tendency particularly when the full stack is in position on the stationary spindle 6 for the lower end of such to press laterally against the rotary spindle 8 whereby the latter is slowed down. In order to avoid this the lower end of the stationary spindle 6 fits into a collar 9 located in the lower bearing 10 of the rotary spindle which latter may be of reduced length for this purpose. The stationary spindle 6 will thus be kept free of the inner surface of the rotary spindle at the lower end thereof. The rotary spindle 8 is mounted in bearings on a bracket 11 secured to and beneath the motor board 12. The spindle 8 has secured thereto a pinion 13 hereinafter referred to.

The inclined platform 7 is made in two sections, one 14 for the 12″ records being rigid while the other 15 for the 10″ records is pivotally secured relatively to the rigid part 14 so that it may be swung down out of the path of the larger records. The supporting part 16 of the rigid section 14 is formed as a housing with the opening facing the spindle 6 so that the pivoting section 15 may be housed below the rigid section 14 when 12″ records are being used.

Pivotal movement of the displaceable section 15 is effected by means of a pivoted lever 17 one arm of which has a pin 18 extending into a slotted arm 19 on the section. The slot 20 is so arranged that by its engagement with said pin 18 the section 15 is held rigid when in the operative or upper position for supporting 10″ records. The other arm 21 of the pin lever 17 extends through an opening in the motor-board 12 and engages in a slot 22 of an actuating lever 23 having a button or stud 24 for manual operation and extending through a slot 25 in the motor-board.

Associated with the stationary section 14 is a reciprocating feeding finger 26. This finger moves in a slot in the platform part 14 and is pivotally connected to one arm of a pivoted lever 27 extending through the opening in the motor-board and operatively coupled to the control element as hereinafter referred to. The displaceable section 15 is also provided with a reciprocating feeding finger 28 extending through a slot in said section. This finger 28 is formed at the end of an arm 29 which is pivotally connected to the feeding finger 26 of the 12″ record station. Thus the 10″ feeding finger 28 receives its motion from the 12″ finger mechanism. The feeding fingers 26, 28 are provided with side grooves which engage the sides of the slots in their respective platform parts.

The 10″ feeding finger 28 will thus be retained in position on the section 15 when the latter is lowered.

The housing 16 for the platform section 14 and 15 is provided with a spring pressed pivoted arm 129 adapted to overlie the stack of records and seat on the uppermost record.

The rotary control element 30 is mounted to rotate on a fixed stud 31 on a vertical axis, the stud being secured to the bracket 11. The rim of the element 30 is formed as a gear wheel 32 having an interruption 33 at one point in its periphery. This gear is adapted to be intermittently driven by the pinion 13 mounted on the turntable spindle 8.

During the period when a record is being played the control element 30 is adapted to be located so that the interrupted part 33 of its rim is opposite the pinion 13 so that no drive takes place.

In order to move the control element 30 to bring its teeth into mesh with the pinion, the control element is provided on its upper surface with a pin or projection 34 which when the element 30 is at rest lies in the path of a trigger 35 movable in accordance with the movements of the tone arm or pick-up 36.

When the record has been played and the needle moves into the run-out or similar groove, the trigger 35 is adapted to engage the pin or projection 34 on the control element and provide an initial movement to bring the teeth 32 thereof into mesh with the pinion 13.

In order to ensure the meshing of the teeth without jarring, the first three or other convenient number of leading teeth on the control element 30 are resiliently mounted so that they may move radially inward with respect to the element. This is effected by forming these teeth 136 on a plate 37 which is pivotally mounted on the element 30, spring means 38 being provided for resiliently holding the teeth in correct relation with the adjacent teeth of the element. A stop pin 37a on the plate 37 engages a hole 37b in the control element and limits the outward movement of the plate. By such arrangement it will be found that the drive will be taken up without difficulty and danger of injury to the gear teeth.

On the upper face of the control element 30 there is provided a cam 39 adapted to control the outward swing of the tone arm or pick-up 36. This cam is engaged by a pin or roller 40 on the arm 41 of a pivoted lever the other arm 42 of which has a pin 43 adapted to co-operate with a cam or curved surface 44 on a lever 45 secured to the tone arm mounting or spindle 46 and which lever conveniently carries the trigger 35 above referred to. The cam 39 on the control element is shaped to provide a dwell period when the tone arm is swung out and a new record is being delivered.

An adjustable stop device is provided for determining the starting position of the tone arm when playing a fresh record and which depends upon the size of the record being used.

This stop device comprises a pin 47 on a bell-crank lever one arm 48 of which is connected by a link 49 to the slotted lever 23 associated with the displaceable section 15 of the record supporting platform.

This stop pin 47 lies in the path of a resetting arm 50 pivotally mounted on the trigger lever 45, there being a spring 51 between the arm and lever whereby the lever (and tone arm) move back to the starting position by the spring 51 under the control of the cam operated lever 42 which swings the tone arm across the record after such has been played.

The spring 51 operates to hold the arm 50 against an adjustable stop 52 carried by the trigger lever 45.

The arm 50 is provided with two surfaces 50a, 50b adapted alternately to engage the stop pin 47 according to the position of the latter and according to which surface engages the pin the tone arm will move into the appropriate starting position before being lowered on to the record.

On the lower face of the control element a cam 53 is provided with which a pin 54 carried by one arm 55 of a bell-crank lever engages. The other arm 56 of the bell-crank lever is connected by a link 57 to a bell-crank lever one arm 58 of which seats beneath a vertically displaceable pin 59 by which the tone arm is adapted to be raised and lowered. The bell-crank lever is pivoted on a fitting 60 which supports the bearings for tone arm spindle 46.

On the lower face of the control element 30 there is also provided a crank pin 61 which engages in the slotted end of a link 62 connected at its other end to the lever 27 for actuating the feeding fingers 26 and 28.

The motor 2 is controlled by a movable switch contact 63 which is adapted to be actuated by a pivoted switch lever 64 one arm of which has a detent 65 which enters a slotted arm 66 of a bell-crank lever. The slot has a projection or shoulder 67 adapted for engagement by the detent 65 in order to retain the switch "in." The detent is held on to the shoulder by a spring 68. Release of the detent and consequent opening of the switch is effected by the lowering of the tone arm on to the tone arm rest 69 having a plunger 70 which engages one arm 71 of a bell-crank lever the other arm 72 of which engages the arm 73 of the slotted bell-crank lever. When the tone arm is lowered on to the rest it moves the plunger 70 downwardly and pivots the slotted arm 66 away from the lever 64 and releases the detent 65. The spring 68 then moves the switch 63 to the "out" position cutting off the current.

The resetting of the switch lever 64 is effected by moving the tone arm manually from the rest 69 to the starting position of the record. In this movement a pin 74 on an extension 75 of the resetting lever 45 engages a cam portion 76 of the switch lever 64, moving the switch contact 63 to its closing position. In this movement of the lever 64 the detent re-engages the shoulder 67 and thus retains the switch closed.

It will be appreciated that while the stack of records is inexhausted the tone arm 36 will be swung across after the playing of a record and then returned to the start position of the next record delivered to the turntable.

In order to automatically cut out the motor 2 after the last record has been played, means are provided whereby the tone arm will be moved to its outermost position above the rest 69 and then lowered on to the cut out plunger 70.

These means are under the control of the spring pressed arm 129 which seats on the uppermost record on the stack.

The arm 129 is provided on the opposite side of its pivotal axis with a short arm 77 which cooperates with a knock-out lever 78. The lever 78 is pivoted beneath the platform 7 and has an upwardly extending arm 79 comprising a finger 80 which is adapted for engagement by the short arm 77 when the last record has been delivered.

The lever 78 has a part 81 which extends to a position beneath the control element 30 and is adapted for engagement by a projection 82 on the control element.

Normally, under the action of gravity the part 81 lies in a position such that no engagement by the projection takes place. When, however, the last record from the stack has been delivered, the arm 129 falls to a position such that the short arm 77 thereof engages the finger 80 pivoting the lever 78 and raising the end 81 into the path of the projection 82.

When in the raised position a tooth 83 on the lever 78 lies in the path of the end of the arm 41 of the tone arm swinging lever 41, 42 so that when the tone arm is moved to its outer position above the rest 69 the end of the arm 41 rides upon the incline 84 and engages the projection 83 so that its pin 40 is prevented from moving down the part $39a$ of the cam 39.

With the arm 41 in this position maintaining the tone arm, upon continued rotation of the control element 30, the pin 40 becomes engaged by a second cam 183 on the control element. While under control of this cam 183, the end 81 of the lever is engaged by the projection 82 on the control element and pivoted so that the arm 41 is released from the projection 83. Such release occurs just prior to the end of the movement of the control element. The pin 40 then moves down the surface $183a$ of the cam 183 so that the lever 41, 42 resumes its position for control by the cam 39. In the meantime the tone arm has been lowered on to the plunger 70 and the current to the motor 2 switched off.

When a fresh stack of records is mounted in position on the platform 7 and spindle 6 it will be noted that it is necessary to place one record on the turntable as the switching on of the motor is effected manually by removing the tone arm from its rest whereupon the tone arm is placed in position with the needle in the starting groove of the record.

It will be appreciated that the automatic control of the switch contact 63 at the end of playing of the last record through the agency of the spring pressed arm 129 enables the mechanism to be used manually for playing single records instead of utilising the record changing mechanism and provided the arm 129 is in the appropriate position the current will be automatically switched off.

Should it be desired to repeat the record automatically it is only necessary to raise the arm 129 so that the knock-out lever 78 is inoperative.

The pivot of the lever 78 is disposed so that gravity acts to move the end 81 downwardly when the part 77 of the arm 129 moves away from the finger 80, but to ensure that the lever end 81 does move down, the part 79 is provided with a curved surface 184 engageable by the part 77 when the arm 129 is raised.

In operation as a record changer, say for playing a stack of 10" records, the button or stud 24 is moved to the appropriate end of the slot 25 so that the displaceable section 15 of the platform 7 is in its operative position. At the same time the stop pin 47 is adjusted to the appropriate position for the resetting of the pick-up. The arm 129 is raised and the first record to be played is placed on the turntable 1 and the remainder of the stack on the platform 7 and spindle 6. The arm 129 is lowered on to the records. The pick-up 36 is then removed from its rest 69 and moved over so that the pin 74 engages the surface 76 of the contact arm 64 to close the switch 6 and energise the motor 2. The pick-up is then placed with the needle in the starting position on the record.

When the needle moves into the run-out groove of the record the trigger 35 engages the projection 34 on the control element 30 imparting an initial movement to the element which brings the gear teeth 136 thereof into mesh with the pinion 13.

As the control element rotates the cam surface 53 engaging the pin 54 pivots the lever 56 and raises the tone arm from the record, whereupon the cam surface $39b$ engaging the pin 40 on the lever 41, 42 pivots such lever bringing the pin 43 thereof into engagement with the surface 44 of the arm 45 whereby the tone arm is swung clear of the record.

The crank pin 61 then engages the inner end of the slot in the lever 62 to operate the record feeding fingers 26, 28 so that 28 releases the lowest record in the stack which is delivered on to the one just played. With continued movement of the control element the pin 40 runs down the surface 39b of the cam 39 so that the lever 41, 42 moves away from the arm 45 under the action of the spring 41a allowing the resetting spring 51 to function to bring the pick-up into the starting position; the pick-up is then lowered under control of the cam 53.

On the last record from the stack being delivered the arm 129 is lowered to the position so that the short arm 77 thereof engages the finger 80 of the knock-out lever 78 and pivots the lever raising the end 81 thereof so that the projection 83 is in position for engagement by the lever 41, 42 so that the motor will be automatically switched off when the record has been played.

When playing a stack of 12" records the stud is moved over to the 12" end of the slot 25, pivoting the displaceable section 15 of the platform 7 downwardly out of the way of the larger record and also moving the resetting stop pin 47 to conform to the size of the record. Thereafter the parts function as set out above for the smaller record.

Certain of the levers and arms may be made in two parts permitting adjustment to be made to assume their correct timing.

In order to relieve the pressure of the pin 40 against the non-operative part 39c of the cam 39 the lever 41, 42 is provided with a second pin 85 adapted to engage the side 11a of the bracket 11.

Various adjusting means may be provided whereby the parts may be set and in the case of the links these may comprise eccentric means whereby the pivotal point may be varied.

I claim:

1. In a phonograph of the type described, including a motor-driven turntable, a driving means rotatable by and with said turntable, a spindle extending upwardly through said turntable and having an offset surface for supporting at their centers records of a stack to be played, a platform for auxiliarly supporting the records of the stack at the peripheral edge of the lowermost record thereof, and a needle carrying a vertically reciprocable, and angularly oscillatable tone arm; the improvement comprising a rotating control member, operatively connected with said tone arm for vertically raising and lowering the same and laterally oscillating the same from a position of rest toward and away from the center of the turntable, and operatively connected with said platform for displacing the lowermost record of the stack from its position on the spindle toward the turntable, said control element comprising an interrupted gear periodically rotatable by said driving means, the interruption of said gear being in register with the driving means during the playing of a record whereby the control member is maintained inactive, and means movable in accordance with the tone arm and adapted when the needle of the tone arm enters the runout groove of the record being played, to engage a surface of and impart an initial movement to the control element for bringing the teeth thereof into mesh with the driving means, the leading teeth of the interrupted gear adjacent the interruption thereof being resiliently mounted whereby meshing of the teeth with the driving means is effectuated when the tone arm has entered the runout groove of the record.

2. In a phonograph of the type described, including a motor-driven turntable, a driving means rotatable by and with said turntable, a spindle extending upwardly through said turntable and having an offset surface for supporting at their centers records of a stack to be played, a platform for auxiliarly supporting the records of the stack at the peripheral edge of the lowermost record thereof, and a needle carrying a vertically reciprocable and angularly oscillatable tone arm; the improvement comprising a rotating control member, operatively connected with said tone arm for vertically raising and lowering the same and laterally oscillating the same from a position of rest toward and away from the center of the turntable, and operatively connected with said platform for displacing the lowermost record of the stack from its position on the spindle toward the turntable, said control element comprising an interrupted gear periodically rotatable by said driving means, the interruption of said gear being in register with the driving means during the playing of a record whereby the control member is maintained inactive, and means movable in accordance with the tone arm and adapted when the needle of the tone arm enters the runout groove of the record being played, to engage a surface of and impart an initial movement to the control element for bringing the teeth thereof into mesh with the driving means, said control element being provided with a pivotally mounted plate movable inwardly against the action of spring means and having a toothed segment adjacent to and leading into the interruption of the gear, whereby successive meshing of the teeth of the segment and of the gear with the driving means is effectuated when the tone arm has entered the runout groove of the record.

3. In a phonograph of the type described, including motor-driven turntable, a driving means rotatable by and with said turntable, a spindle extending upwardly through said turntable and having an offset surface for supporting at their centers records of a stack to be played, a platform for auxiliarly supporting the records of the stack at the peripheral edge of the lowermost record thereof, and a needle carrying a vertically reciprocable and angularly oscillatable tone arm; the improvement comprising a rotating control member operatively connected with said tone arm for vertically raising and lowering the same and laterally oscillating the same from a position of rest toward and away from the center of the turntable, and operatively connected with said platform for displacing the lowermost record of the stack from its position on the spindle toward the turntable, said control element comprising an interrupted gear periodically rotatable by said driving means, the interruption of said gear being in register with the driving means during the playing of a record whereby the control member is maintained inactive, and means movable in accordance with the tone arm and adapted when the needle of the tone arm enters the runout groove of the record being played, to engage a surface of and impart an initial movement to the control element for bringing the teeth thereof into mesh with the driving means, the leading teeth of the interrupted gear adjacent the interruption thereof being resiliently mounted whereby meshing of the teeth with the driving means is effectuated when the tone arm has entered the runout groove of the record, a trigger arm operatively connected to said tone arm and a pin on said control member, said trigger arm being adapted to engage such pin for initiating movement of said control member for meshing as aforesaid.

4. In a phonograph of the type described, including a motor-driven turntable, a driving means rotatable by and with said turntable, a spindle extending upwardly through said turntable and having an offset surface for supporting at their centers records of a stack to be played, a platform for auxiliarly supporting the records of the stack at the peripheral edge of the lowermost record thereof, and a needle carrying a vertically reciprocable and angularly oscillatable tone arm; the improvement comprising a rotating control member operatively connected with said tone arm for vertically raising and lowering the same and laterally oscillating the same from a position of rest toward and away from the center of the turntable, and operatively connected with said platform for displacing the lowermost record of the stack from its position on the spindle toward the turntable, said control element comprising an interrupted gear periodically rotatable by said driving means, the interruption of said gear being in register with the driving means during the playing of a record whereby the control member is maintained inactive, and means movable in accordance with the tone arm and adapted when the needle of the tone arm enters the runout groove of the record being played, to engage a surface of and impart an initial movement to the control element for bringing the teeth thereof into mesh with the driving means, the leading teeth of the interrupted gear adjacent the interruption thereof being resiliently mounted whereby meshing of the teeth with the driving means is effectuated when the tone arm has entered the runout groove of the record, a lower cam surface on said control member and a lever means operatively connected with said tone arm riding on said cam whereby as the control member rotates, the tone arm is successively raised and lowered.

5. In a phonograph of the type described, including a motor-driven turntable, a driving means rotatable by and with said turntable, a spindle extending upwardly through said turntable and having an offset surface for supporting at their centers records of a stack to be played, a platform for auxiliarly supporting the records of the stack at the peripheral edge of the lowermost record thereof, and a needle carrying a vertically reciprocable and angularly oscillatable tone arm; the improvement comprising a rotating control member, operatively connected with said tone arm for vertically raising and lowering the same and laterally oscillating the same from a position of rest toward and away from the center of the turntable, and operatively connected with said platform for displacing the lowermost record of the stack from its position on the spindle toward the turntable, said control element comprising an interrupted gear periodically rotatable by said driving means, the interruption of said gear being in register with the driving means during the playing of a record whereby the control member is maintained inactive, and means movable in accordance with the tone arm and adapted when the needle of the tone arm enters the runout groove of the record being played, to engage a surface of and impart an initial movement to the control element for bringing the teeth thereof into mesh with the driving means, the leading teeth of the interrupted gear adjacent the interruption thereof being resiliently mounted whereby meshing of the teeth with the driving means is effectuated when the tone arm has entered the runout groove of the record, a trigger arm operatively connected to said tone arm and a pin on said control, said trigger arm engaging such pin for initiating movement of said control element for meshing, as aforesaid, an upper cam surface on said control element and a pivoted lever operatively connected with said tone arm and engaging a resiliently mounted member on said trigger arm riding on said cam for controlling the swing out and resetting of said tone arm.

6. A phonograph in accordance with claim 5, wherein the control element is provided with a secondary upper cam surface adapted for engagement by the pivoted lever to maintain the tone arm in the "out" position after the last record in the stack has been delivered and played.

7. In a phonograph of the type described, including a motor-driven turntable, a driving means rotatable by and with said turntable, a spindle extending upwardly through said turntable and having an offset surface for supporting at their centers records of a stack to be played, a platform for auxiliarly supporting the records of the stack at the peripheral edge of the lowermost record thereof, and a needle carrying a vertically reciprocable and angularly oscillatable tone arm; the improvement comprising a rotating control member, operatively connected with said tone arm for vertically raising and lowering the same and laterally oscillating the same from a positioon of rest toward and away from the center of the turntable, and operatively connected with said platform for displacing the lowermost record of the stack from its position on the spindle toward the turntable, said control element comprising an interrupted gear periodically rotatable by said driving means, the interruption of said gear being in register with the driving means during the playing of a record whereby the control member is maintained inactive, and means movable in accordance with the tone arm and adapted when the needle of the tone arm enters the runout groove of the record being played, to engage a surface of and impart an initial movement to the control element for bringing the tooth thereof into mesh with the driving means, the leading teeth of the interrupted gear adjacent the interruption thereof being resiliently mounted whereby meshing of the teeth with the driving means is effectuated when the tone arm has entered the runout groove of the record, a trigger arm operatively connected to said tone arm and a pin on said control element, said trigger arm engaging such pin for initiating movement of said control element for meshing, as aforesaid, an upper cam surface on said control element and a pivoted lever operatively connected with said tone arm and engaging a resiliently mounted member on said trigger arm riding on said cam for controlling the swing out and resetting of said tone arm, and a secondary upper cam surface associated with said control element and engageable by said pivoted lever for maintaining the tone arm in the "out" position after the last record of the stack has been played and releasable catch means for holding the pivoted lever in the "out" position until it is engaged by the secondary upper cam, said means being brought into operation upon the delivery to the turntable of the last record of the stack.

8. A phonograph in accordance with claim 7, wherein the releasable catch means comprises a pivoted catch lever operatively connected with and controlled by a spring pressed arm set upon the record stack and a projection on the control element engaging the catch lever to release the swing out lever.

EDMUND WALTER MORTIMER.

References Cited in the file of this patent

UNITED STATES PATENTS

| Number | Name | Date |
|---|---|---|
| 564,589 | Burson | July 28, 1896 |

| Number | Name | Date |
|---|---|---|
| 2,295,092 | Offen | Sept. 8, 1942 |
| 2,307,030 | Erwood | Jan. 5, 1943 |
| 2,339,981 | Cranmer et al. | Jan. 25, 1944 |
| 2,352,542 | Heins | June 27, 1944 |
| 2,371,222 | Compare | Mar. 13, 1945 |
| 2,371,361 | Small | Mar. 13, 1945 |
| 2,371,362 | Small | Mar. 13, 1945 |
| 2,392,071 | Terrett et al. | Jan. 1, 1946 |
| 2,484,570 | Johnson | Oct. 11, 1949 |
| 2,487,771 | Miller et al. | Nov. 8, 1949 |
| 2,490,678 | Dale | Dec. 6, 1949 |